Nov. 18, 1969   D. A. KELLY   3,478,728
COMPOUND VANE ROTARY INTERNAL COMBUSTION ENGINE
Filed Dec. 4, 1967   3 Sheets-Sheet 1

INVENTOR.
Donald A Kelly

Nov. 18, 1969  D. A. KELLY  3,478,728
COMPOUND VANE ROTARY INTERNAL COMBUSTION ENGINE
Filed Dec. 4, 1967  3 Sheets-Sheet 2

INVENTOR.
Donald A Kelly

Nov. 18, 1969  D. A. KELLY  3,478,728
COMPOUND VANE ROTARY INTERNAL COMBUSTION ENGINE
Filed Dec. 4, 1967  3 Sheets-Sheet 3

INVENTOR.
Donald A. Kelly

United States Patent Office

3,478,728
Patented Nov. 18, 1969

---

3,478,728
COMPOUND VANE ROTARY INTERNAL COMBUSTION ENGINE
Donald A. Kelly, 58—06 69th Place,
Maspeth, New York, N.Y. 11378
Filed Dec. 4, 1967, Ser. No. 687,734
Int. Cl. F04b 1/10; F02b 53/08
U.S. Cl. 123—16     9 Claims

ABSTRACT OF THE DISCLOSURE

A multiple vane rotary I.C. engine in which the compressed air-volume under the vane is forced radially into multiple holes and into the outer rotary compressed cavity. The engine consists of a slotted rotor, multiple wide piston type vanes which are guided in their radial clearance with the cylindrical housing bore by miniature ball bearings. The inner ends of the vanes are fitted with rectangular sealing rings to seal the compressed air.

Figure 1:
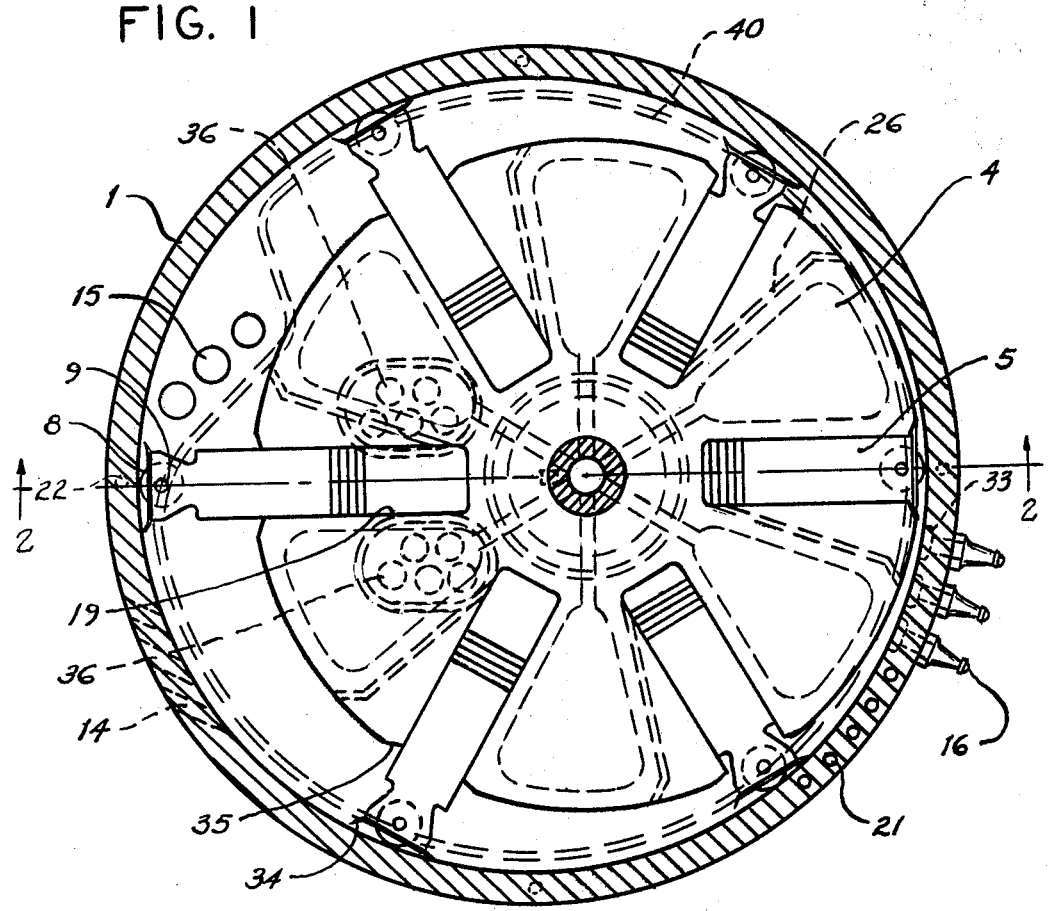

The object of the compound type engine is to combine the compressing air volumes formed by the displacing vanes to achieve a high compression ratio for an accentric rotary engine.

---

This invention relates to a rotary internal combustion engine of the multiple vane type, in which the power vanes also function as radial pistons to provide an increased compressed air volume for the rotary compression cavity.

The vanes are restrained by ball bearings so that the vane lips and seals revolve in close proximity with the inside walls of the cylindrical housing but do not touch them at any point during rotation.

The object of all current rotary engine effort is to obtain high compression ratios at a minimum of sealing friction, so that the highest operating efficiencies will be reached. It is difficult to obtain high compression ratios while maintaining near zero vane friction since the two functions are basically incompatible.

A reasonable trade-off may be evolved in which close vane clearance is maintained while the compression ratio is kept high by tight clearance and vane baffling arrangements.

Baffling would be accomplished by Y shaped portions at the vane ends and sides. These would act to contain the rapidly expanding gases upon ignition by deflecting the pressure surge inward toward the rotor periphery. The effectiveness of the Y baffling elements in restricting pressure loss is contingent on the Y lip angles.

Most of the current rotary I.C. engines provide vane sealing in order to obtain high compression ratios, but in so doing inherit the seal wear and lubrication problems.

Some types of free rotary engines do not attempt to seal the vanes, but rather run in contact with no seals, or with slight clearance between the vane tips and the housing bore walls which results in loss of compression.

This vane rotary engine will be in the same class as the latter, but with the addition of the vane baffling arrangement.

The vanes are fitted with Teflon or Viton sealing rings to contain the pressure of the compressed air volume. The engine end plates' inner faces form the sealing side for the rotor slots. The rotor must fit closely between the two end plates so that little or no pressure escapes.

The engine design is envisioned as attractive for many applications since it utilizes simple geometry shapes and provides concentric shaft output, which assures low initial cost and lower operating costs.

Instead of expensively formed turbine blades and precise components, the vane rotary engine requires only simple vanes and baffles with a plain cylindrical rotor transmitting torque to the output shaft.

The vane rotary engine is advantageous for certain applications such as automotive, light marine use since it provides additional performance characteristics unlike an equivalent rated gas turbine.

It is possible that this vane rotary engine may be evolved to exceed the high power-to-weight ratios of the gas turbine and exceed the economy of the C.I. engine at a lower initial cost and lower operating costs. The performance of the engine may be improved by combining two units in a two-stage tandem arrangement to increase the final compression ratio, in which case fuel economy would be enhanced.

The rotary portion of the engine does not present too difficult a cooling problem, but the internal radial vanes do present an unusual and complex cooling problem. It is believed that additional cooling of the vanes and rotor slot walls is by forced air flow through a hollow drive shaft and internal cavities in the rotor.

Lubrication of the internal vanes presents a problem that should be overcome by utilizing low friction Teflon or Viton for the sealing rings as well as using an oil/fuel mixture. A forced oil lubrication system may be necessary where the other methods prove insufficient.

Complete combustion within the compressed instant cavities will be achieved by the use of multiple spark plugs over the entire combustion area. In addition to raising the operating efficiency of the engine complete combustion will lower the toxic and noxious level of the exhaust to support anti-air pollution programs.

The engine design will incorporate an air intake preheating unit and an exhaust oxidizing unit to provide an effective suppressant system.

An additional feature to the vane sealing arrangement would be the adding of flexible flap seals of metal or Teflon which would be bonded to the top of the Y section and along the vane sides. The function of the flap seals would be to provide contact sealing during the compression and combustion phases, and run clear of the cylinder bore for the balance of the rotation.

Another variation of the engine would be the inclusion of interlocking sealing strips along the top of the Y section and along the vane sides. When sealing strips are used in the vanes the ball bearings must be placed at the vane sides and circular bearing grooves added to the inside of the side plates. The rolling contact of the bearings wtih the outside diameter of the grooves will assure that the seal ends just clear the housing bore with close clearance. The circular grooves are concentric to the housing bore so that the vanes are thereby controlled in their radial position with respect to the housing bore.

The miniature ball bearings placed on the vane sides are not subjected to as high a peripheral speed as the bearings placed at the ends of the vane between the Y section.

The ball bearings are subjected to the severe environment of high temperatures and high speeds within the combustion cavity. These bearings may have to be specially produced to meet all these conditions including the thrust load from the vanes.

A small number of vanes may be utilized in which case the vanes can be made wider in order to increase the vane combustion volume. A large diameter engine will require a proportionately larger number of vanes for volumetric efficiency. A large number of vanes will assure a smooth power flow.

The vanes arranged with side ball bearings may be fitted with separate Y baffles and sealing ring. The purpose of this arrangement is to provide additional baffling effect since the upper section of the vanes will have a V notch so that two sets of baffles will result.

The multiple vanes are set in close-fitting slots in the rotor and thereby guided in their radial displacement as the rotor revolves. The depth of the rotor slots is based on vanes with baffles being fully retracted into them at the top vertical or flush position with a slight clearance at the bottoms of the vanes.

The rotor of the engine must be hollowed out or built-up of ribs and sectors to keep the overall weight of the engine within desirable limits.

The rotary vane engine will have only moderate speed change response since it is essentially a high speed machine. The torque output must be transmitted into a gear reduction box and speed changes made in a conventional manner.

For the rotary portion cooling requirements axially, holes will be provided within the cylindrical housing wall which should be closely spaced for cooling efficiency. Parallel coolant flow through the holes will be required for maximum heat transfer. Corresponding in-line holes will be located in the end plates with the gaskets providing sealing, so that the coolant flows through the entire engine width. A coolant manifold will be required at both engine ends for distribution of the circulating coolant.

The principal object of the invention is to achieve high compression for increased performance by utilizing the additional compressed volumes under the vanes.

It is an object of the invention to produce a basically simple rotary I.C. engine with a minimum of friction in operating parts.

It is an object of the invention to produce a vane rotary engine which is relatively inexpensive to manufacture by utilizing simple geometric shapes and low cost components.

It is an object of the invention to build a simple rotary engine which achieves nearly complete combustion within the combustion cavities in order to greatly reduce the noxious and toxic level of the ehxaust gases.

It is an object of the invention to produce a simple rotary engine with a minimum number of operating parts for ease of production, replacement and maintenance.

Other features and variations will become apparent from the following description of the vane engines.

It should be understood that variations may be made in the detail engine design without departing from the spirit and scope of the invention.

Figure 2:
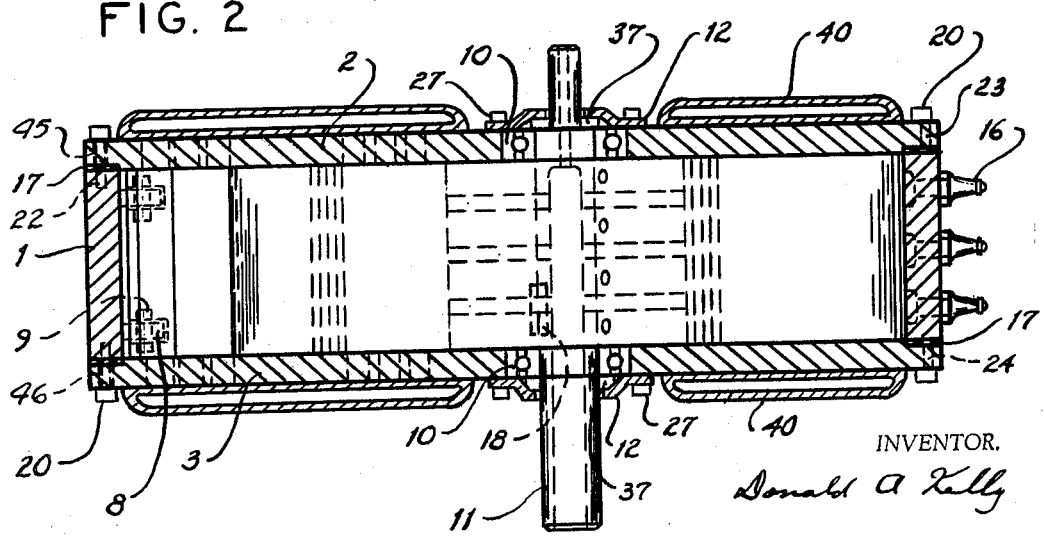
Figure 3:
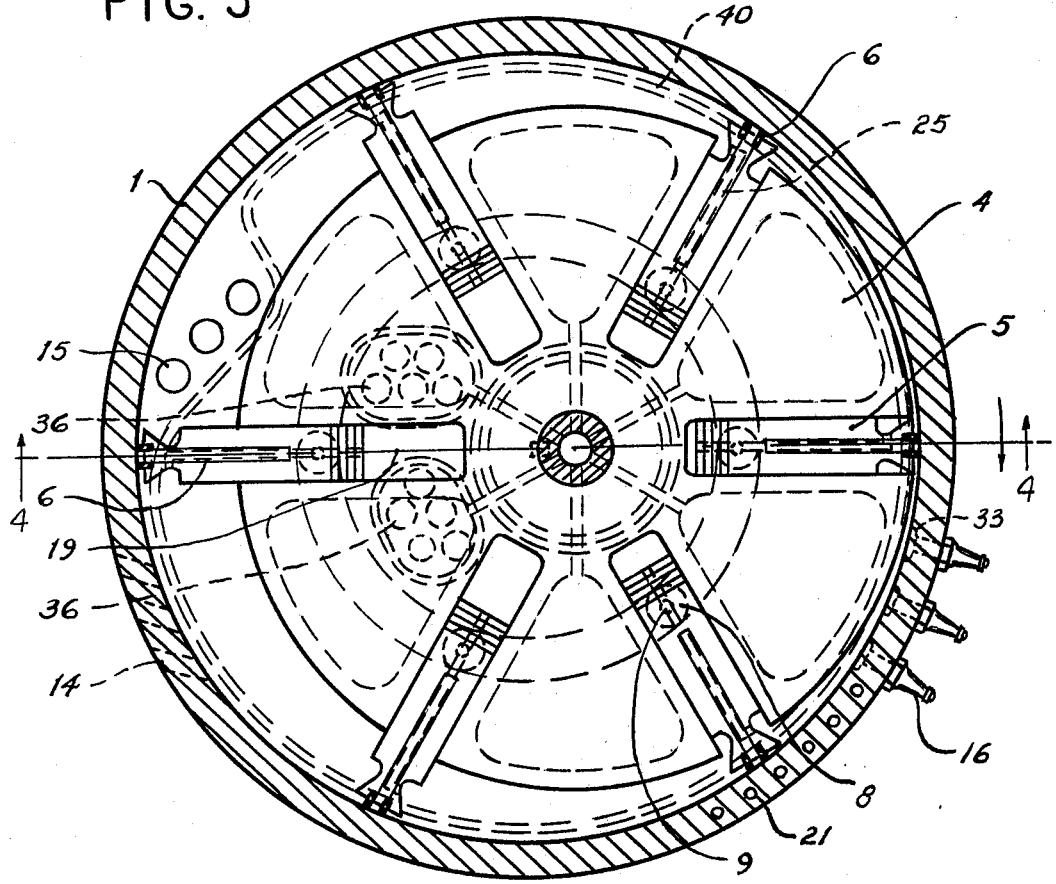
Figure 4:
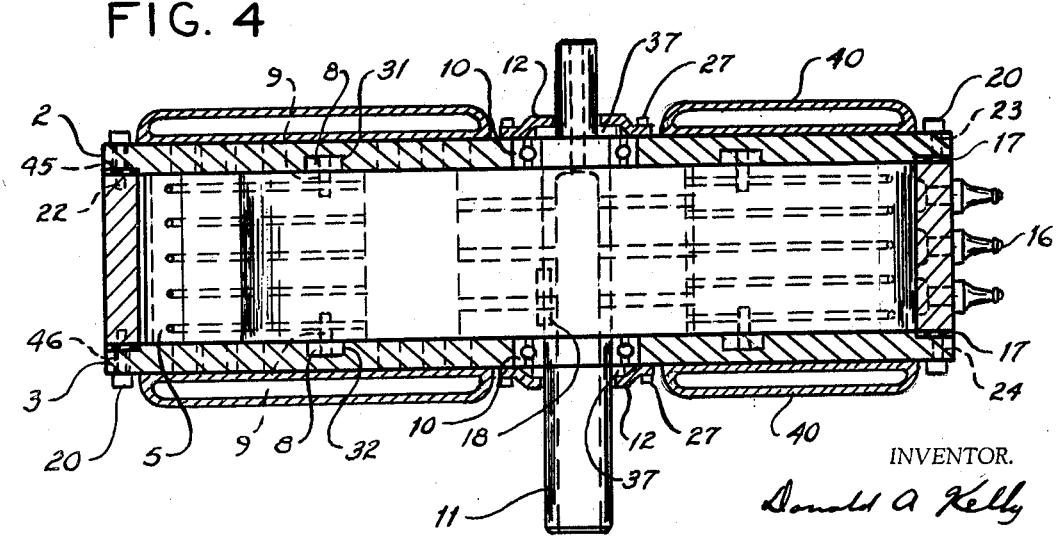
Figure 5:
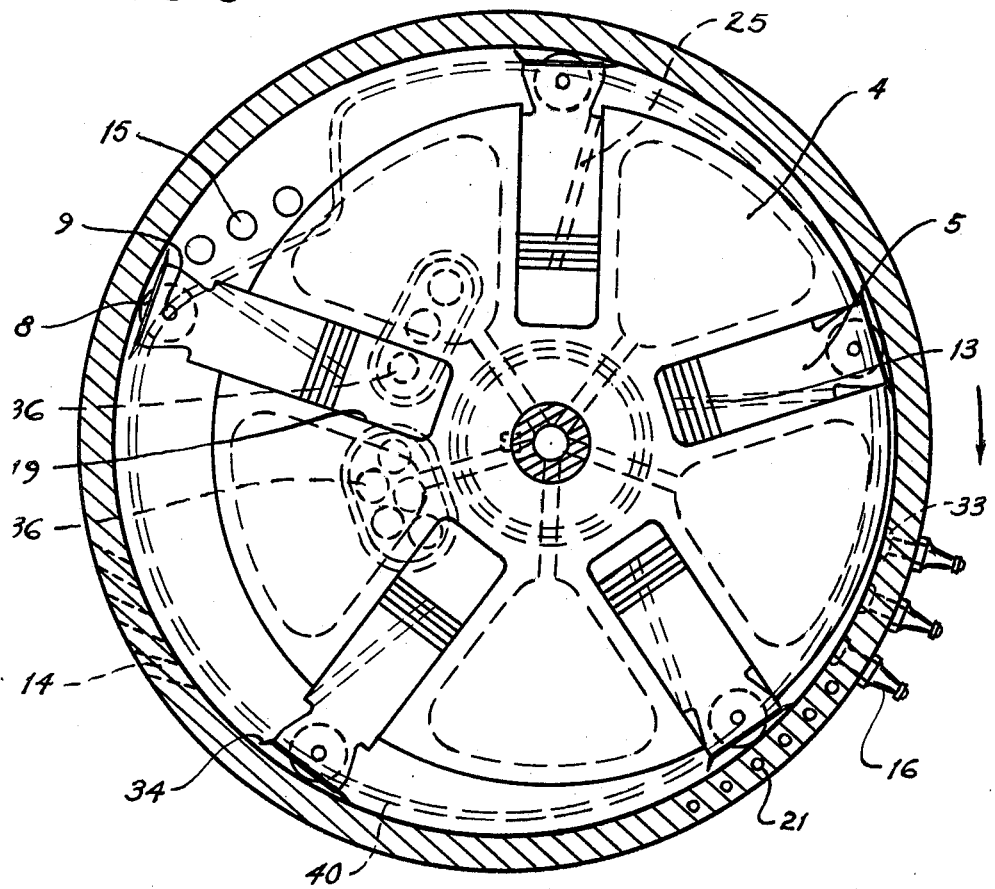
Figure 6:
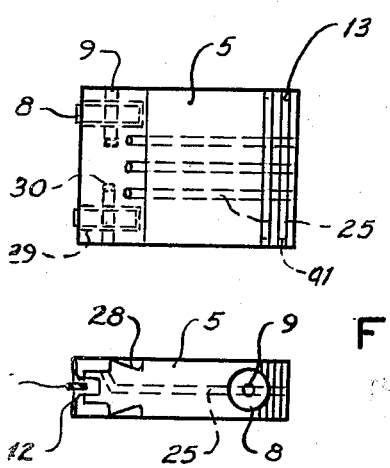
Figure 7:
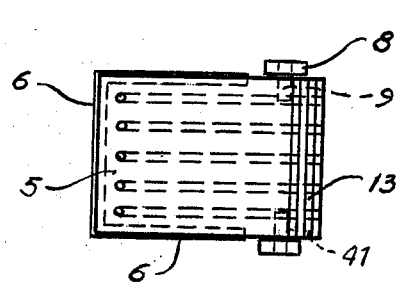
Figure 8:
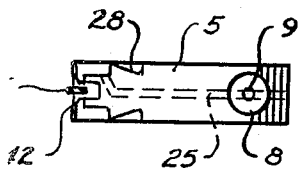

In the accompanying drawings:
FIGURE 1 is a top sectional view of the compound vane rotary engine.
FIGURE 2 is a side sectional view through the engine.
FIGURE 3 is a top sectional view of an alternate vane guidance arrangement.
FIGURE 4 is a side sectional view through the alternate engine arrangement.
FIGURE 5 is a top sectional view of a wide vane rotary engine.
FIGURE 6 is a side view of a vane with top ball bearings and transfer holes.
FIGURE 7 is a side view of an alternate vane with side ball bearings and transfer holes.
FIGURE 8 is a top view of a vane with side ball bearings and transfer holes.

Referring now in more detail to the accompanying drawings, number 1 is the cylindrical housing. The cylindrical housing 1 contains the coolant holes 21 and the mounting tapped holes 22. The two end plates 2 and 3 are secured to the cylindrical housing 1 by the machine screws 20. The end plates 2 and 3 contain the coolant holes 23 and 24 respectively and the mounting holes 45 and 46 respectively. The gaskets 17 provides a pressure seal and coolant seal between the cylindrical housing 1 and the end plates 2 and 3. The slotted rotor 4 is offset within the cylindrical housing 1 bore and supported by the drive shaft 11. The drive shaft 11 is supported by the two tapered roller bearings 10 fitted within the end plates 2 and 3. The two retainers 12 are secured to the end plates 2 and 3 with the screws 27, and hold the shaft seals 37 in place to keep dirt and grit from entering the engine at these points.

The rectangular key 18 secures the rotor 4 to the shaft 11 both radially and axially. The multiple vanes 5 are closely fitted within the rotor slots 19 with both provided with a machine finish of RMS 16, or better. The vane 5 width exactly matches the rotor 4 width and both are closely fitted within the cylindrical housing 1 and plates 2 and 3 assembly.

The vanes 5 are provided with side V notches 28 at their upper ends and two bearing slots 29 in the top surface. Two pin holes 30 are provided at the sides which enter the bearing slots 29. The ball bearings 8 are mounted within the bearing slots 29 and supported by the bearing pins 9.

The lower ends of the vanes 5 are provided with rectangular grooves 41 which are required for mounting the sealing rings 13. One, two or three grooves and rings 13 may be provided in each piston/vane depending on the compression level requirements.

The vanes 5 have multiple transfer holes 25 which run from the bottom to the near top of the vanes. The transfer holes 25 may run at a diagonal or may be drilled in opposite directions at a relative angle to one another.

An alternate vane 5 design would consist of the ball bearings 8 and pins 9 being mounted at the lower sides of the vanes. In this arrangement, concentric rectangular grooves 31 and 32 must be provided in the end plates 2 and 3 respectively which serve to guide the vane displacement and insure that the vane tips clear the cylindrical housing 1 bore by from .005 to .010.

The vanes may also be provided with additional Y 42, in each place and sealing strips 6 at the top and around the sides of the vanes. The additional Y inserts 12 would provide additional baffling effect for the vanes, and the sealing strips 6 would aid in baffling and setting up a turbulent flow at the vane tips.

The cylindrical housing 1 is provided with multiple spark plugs 16 which are uniformly mounted over the combustion cavity at a mean angle of about 20 degrees off side dead center in either direction of rotation as required. The cylindrical housing 1 bore is provided with combustion pockets 33 which nest the spark plug electrodes and aid in swirling the fuel/air mixture during combustion.

Both the rotor 4 faces and the inside surfaces of the end plates 2 and 3 are provided with a machine finish of RMS 16 or better, and are treated with a low friction film.

The cylindrical housing 1 has multiple exhaust ports 14 tangentially disposed at the side of the housing approximately 140 degrees from the spark plugs' center, to carry out the exhaust gases after the power phase is complete. Axial intake ports 15 are placed in either or both of the end plates 2 and 3 approximately opposite from the center of the spark plugs.

Intake ports 15 may be tangentially located within the cylindrical housing for some applications where priming and supercharging may be desirable.

Intake ports 36 are located in either or both of the end plates 2 or 3, at the same angular position at the intake ports 15, but positioned over the lower piston/vane intake cavity. The liquid coolant jackets 40 are secured to the plates 2 and 3.

An additional vane sealing arrangement would be that of adding a flexible flap seal 34 of beryllium or bronze which would be bonding to the top of the vanes. The flap seals must be set to run clear of the cylindrical bore and at close clearance. When flap seals are used, clearance V grooves 35 must be machined into the ends of the vane slots 19, to give clearance for nesting of the flap seals 34 during full refraction of the vanes at side dead center.

In an alternate rotor 4 design, the transfer holes 26, which serve the same function as the transfer holes 25 in the vanes 5, are located radially at the base of the rotor slots 19 and run to the rotor periphery. These may also be drilled in two sections of a relative angle, so that the compressed air is directed into the combustion cavity.

The cylinder housing 1 may be provided with mounting lugs which are not shown, or mounting may be accomplished by utilizing the end plates 2 and/or 3 and securing them to suitable support means with the machine screws 20.

The distributor system which is not shown would cause all the spark plugs 16 to fire simultaneously at each compressed cavity position. The distributor is driven directly from the top projection of the drive shaft 11. The distributor would be phased with the rotor so that ignition occurs when the center of the compression cavity is coincident with the mean angular spark plug 16 position.

A fuel injection system may be adopted for many applications or a carburetor may be utilized if required for specific applications.

The exhaust ports may be fitted with a powered blower arrangement to increase overall engine efficiency and to reduce noxious combustion products.

A starter motor and drive arrangement which is not shown, would be connected to the rear projection of the drive shaft 11. An alternator should also be bolt-connected to a pulley on the shaft projection 11.

Most of the accessory units applicable to I.C. reciprocating engines would be used on the vane rotary engine and are not shown for the sake of clarity and since they are stock items.

What is claimed is:

1. In a rotary internal combustion engine, a cylindrical housing with vertical axis, a substantially circular cavity within said cylindrical housing, a multiple slotted rotor at close clearance at one point of said cavity, multiple radially disposed vanes closely fitted within the said slots of the said slotted rotor, two end plates secured at the top and bottom of the said cylindrical housing, sealing and spacing control means disposed between the said cylindrical housing and end plates, exhaust ports tangentially disposed at one side of the large crescent cavity formed by the said cylindrical housing and slotted rotor, intake ports axially disposed within the said end plates at the opposite side of the said large crescent cavity, a vertical drive shaft secured to the said slotted rotor, bearing means within said end plates supporting said vertical drive shaft, multiple radially disposed spark plugs secured to the outside of the said cylindrical housing.

2. The combination set forth in claim 1 wherein the said multiple radially disposed vanes are notched and slotted at the upper ends, dual miniature ball bearings are secured at the upper ends, multiple sealing rings are notched into the lower ends.

3. The combination set forth in claim 1 wherein the said multiple radially disposed vanes are provided with multiple through holes disposed from top to bottom.

4. The combination set forth in claim 1 wherein the said multiple radially disposed vanes are fitted with dual ball bearings secured at the lower sides, the said end plates provided with circular concentric grooves within the inside faces coacting with the said dual ball bearings.

5. The combination set forth in claim 1 wherein the said multiple radially disposed vanes are fitted with separate shaped strips at the upper end, sealing strips secured within the said separate shaped strips.

6. The combination set forth in claim 1 wherein the said multiple slotted rotor has uniformly disposed internal cavities between the said slots, multiple radially disposed transfer holes disposed between the base of the slots and the periphery of the said multiple slotted rotor.

7. The combination set forth in claim 1 wherein the multiple radially disposed vanes are provided with low friction sealing strips at the upper ends and along the sides.

8. The combination set forth in claim 1 including a through cooling hole within said vertical drive shaft, radially disposed cooling holes adjacent to the said slots within the said multiple slotted rotor communicating with said cooling hole.

9. The combination set forth in claim 1 including axially disposed cooling holes within the walls of the said cylindrical housing, corresponding axially disposed cooling holes within the said end plates, liquid coolant jackets secured to the said two end plates connected to a coolant circulating system.

References Cited

UNITED STATES PATENTS

| | | | |
|---|---|---|---|
| 2,373,304 | 4/1945 | Garbeth | 123—16 |
| 2,688,924 | 9/1954 | Links | 103—161 XR |
| 3,181,512 | 5/1965 | Hapeman | 123—16 |
| 3,301,232 | 1/1967 | Eickmann | 123—16 |
| 3,352,291 | 11/1967 | Brown | 123—16 |
| 3,398,725 | 8/1968 | Null | 123—16 |

FOREIGN PATENTS 149,600   8/1920   Great Britain.

C. J. HUSAR, Primary Examiner

U.S. Cl. X.R.

103—161